Oct. 5, 1965

TAKESHI TOHYAMA 3,209,586

DEVICE TO TRANSFORM A DISPLACEMENT OR A FORCE INTO A SIGNAL IN ELECTRICAL CURRENT

Filed Jan. 3, 1961

2 Sheets-Sheet 1

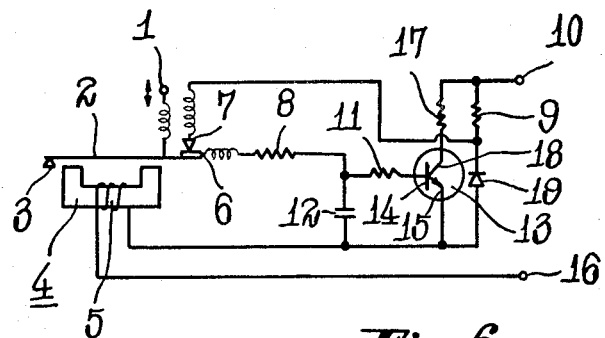
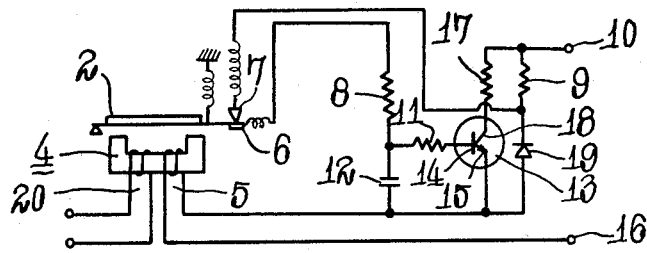
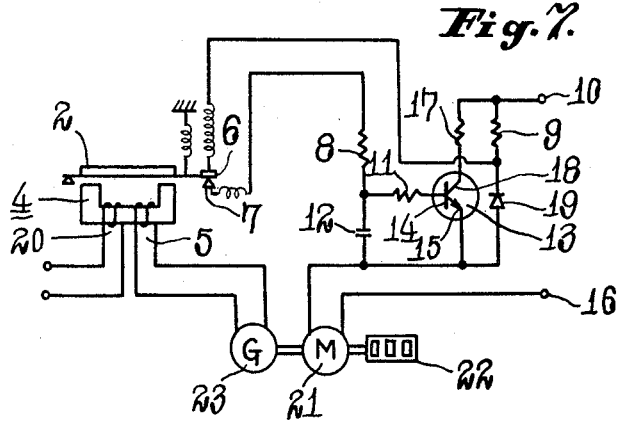

United States Patent Office 3,209,586
Patented Oct. 5, 1965

3,209,586
DEVICE TO TRANSFORM A DISPLACEMENT OR A FORCE INTO A SIGNAL IN ELECTRICAL CURRENT
Takeshi Tohyama, 1349 1-chome, Kamimaruko
Sanno-cho, Kawasaki, Japan
Filed Jan. 3, 1961, Ser. No. 80,473
Claims priority, application Japan, Jan. 6, 1960, 35/213;
Aug. 1, 1960, 35/33,595, 35/33,596, (utility model)
35/39,698, (utility model) 35/39,699; Aug. 26, 1960,
35/36,234
7 Claims. (Cl. 73—141)

This invention relates to a device which transmits signals according to a measured force or displacement and which includes a balancing beam and a transistor. The balancing beam is pivoted at one end to swing under the influence of forces acting therealong. An electrical contact is provided at the other end of the beam and is arranged together with a fixed contact in conjunction with an electromagnetic system which restores the beam to a null position. This restoring system includes a coil and a current amplifying transistor. The transistor is associated with the coil in a manner such that the coil is energized by the collector current of the transistor; which current is caused to vary in accordance with the transistor base current. The base current is regulated to gradually increase and decrease according to the relative position of the said contacts. Means are provided in association with the base circuit of the transistor for forming a delaying circuit. Such means would include a resistor and a capacitor whose relative values of resistance and capacitance determine the delay circuit time constant. In the present system a signal, representing a displacement or a force, is transformed into a current signal which can be transmitted to any point remote from the device via a two wire transmission line. This line would also include a D.C. power source and a variable loaded resistance connected in series with the device.

Figure 1:
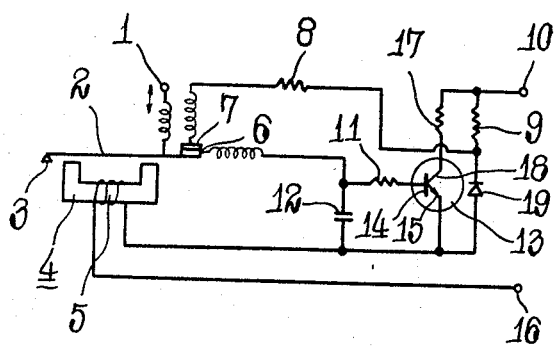
Figure 2:
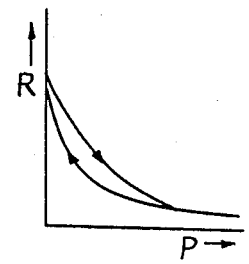
Figure 4:
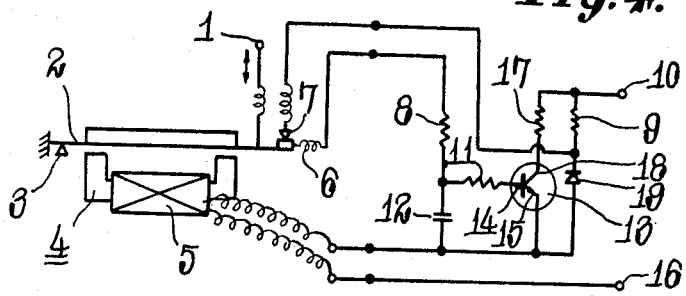
Figure 5:
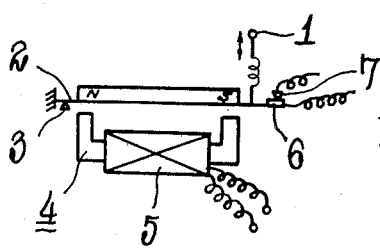

The following specification together with the several appended drawings will serve to illustrate and explain the operating features of this invention. In the drawings: FIG. 1 is a circuit diagram of one embodiment of the invention, wherein the above said contacts are a combination of the same or different kinds of elements selected from metals, carbon, carbon-natured compounds and semiconductive bodies, each having comparatively high contact resistance, and the said contacts are adapted to contact each other with a slight pressure at the state of equilibrium of the beam; FIG. 2 is a graphic representation of the relation between the pressure and contact resistance of the said contacts; FIG. 3 is a circuit diagram of a second embodiment of the invention, wherein the contacts are adapted to part from each other at the point of equilibrium; FIG. 4 is a circuit diagram of a third embodiment of the invention, wherein a movable iron is used in the restoring system; FIG. 5 is a circuit diagram of a fourth embodiment of the invention, wherein a movable magnet is used in the restoring system; FIG. 6 is a circuit diagram of an applied example of this invention, wherein the restoring system is provided with a current coil so as to be employed as a current-current transformer by flowing the current to be measured therethrough, and FIG. 7 is a circuit diagram of another example of this invention, wherein an integrator driven by a motor which is coupled with a generator is provided, the said motor being supplied with current from the output of the transistor and the restoring coil is supplied with the output current of the said generator.

In FIG. 1, 1 is a source of displacement such as a Bourdon tube, 2 is a beam to be balanced, 3 the pivot thereof, 4 an electromagnetic restoring system, and 5 the coil thereof. A pair of contacts 6 and 7 is provided. These contacts may be of the same or different kinds of material selected from metals, carbon, carbon natured compounds, and semi-conductors. One contact piece 6 of the pair is fixed on the free end of the balancing beam and the other piece 7 is stationally disposed. The contacts and beam are arranged such that when the beam is at a state of equilibrium, the contacts are held against each other with a slight pressure. There are provided input-output terminals 10 and 16 which can be inserted in series into a circuit of any desired length; so that a two-wire line can be used to transmit force or displacement information to any point remote from the device simply by connecting a D.C. voltage source in series at any point along the line. The line moreover may include loaded and line resistances.

The current entering into the device from the first terminal 10 will be divided into two branch circuits, the one branch consisting of a resistor 17, the collector 18 of a transistor 13 and the emitter 15 of the transistor. The other branch consists of a resistor 9 and a zener diode 19. Both branches are rejoined at the output side of the zener diode. The joined current passes through the coil 5 of the electromagnetic restoring system 4 to the other terminal 16. One more branch circuit, beginning at the junction point of the resistor 9 and the zener diode 19, runs through a large resistor 8, the pair of contacts 6 and 7 and another resistor 11 to the base of the transistor 13. A condenser 12 is inserted between the emitter 15 and a point between the resistor 11 and the contacts 6.

The voltage across the zener diode 19 is kept constant independently of how the voltage between the terminals 10 and 16, and consequently the magnitude of current flowing therethrough, may be varying. The transistor base current thus can perform a governing action based on the continuity or interruption at the contacts 6 and 7 or the variation of the contact resistance thereof without being influenced by the current through the terminals 10 and 16.

Now, if a movement of the source of displacement 1 or if, for example, the Bourdon tube is urged upwardly, the contacts 6 and 7 will be brought into contact or the contact pressure between them will increase. This reduces their contact resistance and produces an increase in the base current of the transistor 13. This increased base current flows through the resistor 8 and across the contacts 6, 7, resulting in an increase of collector current. This increased collector current additionally flows through the coil 5 of the electromagnetic restoring system 4. The increase of the current through the electromagnetic restoring system 4 tends to reduce the pressure of the contacts 6, 7, or even to separate them. The above described restoring effect will produce a proportional relationship between the magnitude of displacement or pressure acting on the displacement source 1, and the current flowing through the coil 5. The variation of the current in the base circuit of the transistor due to the sudden change of current through the circuit, including the contacts 6 and 7, is modified by the time constant characteristic of the circuit consisting of the condenser 12 and the resistor 11. The equivalent resistance between the collector and the emitter of the transistor can vary over a very wide range, and the current through the circuit including the zener diode is adjusted to be kept at a small constant value compared with the current flowing through the transistor; so that the output current will always be maintained at a value proportioned to the displacement or pressure to be measured, even though the voltage across the terminals 10, 16, may vary over a very wide range. Thus, a device according to the invention is capable of transforming a signal in the form of a displacement or force into a current signal, and then transmitting it, if necessary, from the measuring point to any remote point through a two wire line in which any variable loaded resistance may be inserted and a D.C. power source can be located in series at any point along the line.

The diagram of FIG. 2 shows the relation between a slight pressure P acting between the contacts 6, 7, and the resulting contact resistance R. As may be seen in this diagram, the relation between the pressure P and the resistance R appears to be unstable, as a rule, some hysteresis effect being associated therewith. In this invention, however, a very stable and accurate force-current transforming action is realized according to the restoring effect resulting from the condenser 12 being inserted in the base circuit of the transistor 13. Thus a displacement takes place or a force is applied on the beam 2 to cause an unbalance, whereby the contact resistance between the contacts 6 and 7 is decreased, the base current of the transistor 13 will begin to increase at the same time along an exponential curve governed by the time constant which is determined by the resistor 11 and capacitor 12. This variation causes the transistor collector current to increase, which current flows through the coil 5 of the electromagnetic restoring system, and the increased restoring force will restore the beam 2 to balance at a point where a suitable contact resistance has been reached. On the other hand, if the displacement or a force is decreased to increase the contact resistance between the contacts 6 and 7, or momentarily to open the said contacts, the base current of the transistor 13 will then begin to decrease gradually along another exponential curve thereby causing a discharge of the capacitor 12, so that the decrease of the output current of the transistor will bring the beam to balance at a point where a suitable contact resistance has been reached between the contacts 6 and 7. In the circuit of the second embodiment of this invention shown in FIG. 3 the arrangement is such that when the contacts 6 and 7 which are disposed around the free end of the balancing beam 2 are closed, the output current of the transistor will increase along an exponential curve, but when the contacts 6 and 7 are caused to part from each other, the output current will decrease along another exponential curve, whereby equilibrium is attained at the position where the contacts 6 and 7 close and open intermittently.

As may be seen from the above description, in the arrangement proposed by this invention, the variation of the contact resistance between the contacts due to the variation of the pressure therebetween or the opening and closing thereof is utilized as a medium to transform a force or a displacement into an electrical current at the same time the capacitor is inserted into the circuit connecting the base and emitter of the transistor, whereby a stability is maintained between them, so that the force or the displacement can be promptly responded to by the output current varying along exponential curves, the current being fed back to the restoring system. Since the contact resistance depends solely on the contact pressure there is no necessity for any displacement which would otherwise generally be needed.

This present device can be applied to provide a signal transforming function in a simple manner not only by utilizing the moving coil type restoring system 4 having a linear characteristic with respect to space, but also by utilizing the moving iron or moving magnet type restoring system having a nonlinear characteristic such as the devices shown in FIG. 4 and FIG. 5. Also, a current-current transforming device may be incorporated as the electromagnetic restoring system 4. In this case there is provided a current coil 20 as shown in FIG. 6, through which the current to be measured is adapted to flow. Further, as shown in FIG. 7, this device can be applied to provide a current integrator. In such case there is provided in the output circuit of the transistor a current-current transforming device such as a motor 21, the rotation of which is communicated to an integrator 22 and a generator 23. The output current of the generator is fed to the restoring coil 5 of the electromagnetic restoring system.

In the device according to this invention, the variation of the output current directly influenced by the variation of the contact resistance between the contact 6 and 7 can be made very low, and by inserting a voltage stabilizing diode 19 between resistor 9 and the emitter 15 of the transistor 13, the above said influence may further be decreased as to be negligible. This is very advantageous in that the maximum amount of the base current of the transistor is limited to a reasonable value.

What I claim is:

1. A device for transforming forces into electric current signals, said device comprising a pivotally mounted balance arm, means for connecting said balance arm to a source of force to be measured, an electrically powered restoring force producing system arranged to exert counterforces upon said balance arm, a pair of electrical contact elements, the contact resistance between said elements being variable with the contact pressure to which they are subjected, one of said contact elements being mounted on said balance arm, and the other contact element being fixed at a position contacting said one contact element, a transistor having a collector, an emitter and a base, a pair of terminals, means connecting said electrically powered restoring system and the collector and emitter of said transistor in series between said terminals, a high resistance circuit, including said contact elements, connected between the base and collector of said transistor and a capacitor connecting the emitter of said transistor and a point in said high resistance circuit between said contact elements and said transistor base, said terminals serving as input terminals to receive energizing power from an external power supply source, and also, when so connected, as output terminals for delivering electric current signals proportioned to the force being measured to a utilization device, the base current of said transistor varying with said contact resistance, the collector current of said transistor varying in accordance with said base current and said restoring system being powered by said collector current whereby all current passing into and out of said system passes through said terminals and through said electromagnetic restoring force producing system.

2. A device as in claim 1 wherein said contact elements are constructed of materials selected from the group consisting of metals, carbon, carbon-natured compounds and semi-conductive bodies.

3. A device as in claim 1 wherein the forces acting on the balance arm are derived from an indirectly acting electric current.

4. A device as in claim 1 wherein the electrically powered restoring force producing system comprises an electric motor, an integrating mechanism and a generator driven by said motor and an electromagnetic force producing coil arranged to receive energization from said generator and to act upon said balance arm.

5. A device as in claim 1 and including a voltage stablizing diode between the emitter of said transistor and a point in said high resistance circuit on the opposite of said contacts element from the point of connection to said capacitor.

6. A device as in claim 1 wherein said restoring force producing system includes a moving iron type electromagnetic force producing device.

7. A device as in claim 1 wherein said restoring force producing system includes a moving magnet type electromagnetic force producing device.

References Cited by the Examiner

UNITED STATES PATENTS

| | | | |
|---|---|---|---|
| 1,953,819 | 4/34 | Payne | 73—88.5 X |
| 2,426,396 | 8/47 | Isenberg | 73—398 |
| 2,694,128 | 11/54 | Maurin | 200—166 |
| 2,752,558 | 6/56 | Kane | 200—166 |
| 2,789,254 | 4/57 | Bodle et al. | 307—88.5 |
| 2,861,239 | 11/58 | Gilbert | 307—88.5 |
| 2,867,043 | 1/59 | Jarret et al. | 200—166 |
| 2,885,575 | 5/59 | Culwen | 307—88.5 |
| 2,904,735 | 9/59 | Cullen et al. | 318—32 |
| 2,925,544 | 2/60 | Lang | 73—88.5 X |
| 2,940,747 | 6/60 | Eder et al. | 73—141 X |
| 3,030,814 | 4/62 | Ainsworth | 73—517 X |

RICHARD C. QUEISSER, *Primary Examiner.*

CHARLES A. CUTTING, DAVID SCHONBERG, JOSEPH P. STRIZAK, *Examiners.*